United States Patent Office 2,990,266

Patented June 27, 1961

1

2,990,266

METHOD FOR CONTROLLING PLANT GROWTH

Jamal S. Eden, Painesville, Ohio, assignor to Diamond Alkali Company, Cleveland, Ohio, a corporation of Delaware No Drawing. Filed June 10, 1957, Ser. No. 664,476
2 Claims. (Cl. 71—2.7)

This invention relates to novel products of the reaction of paraformaldehyde with an alkanolamine, especially alkanol amine-formaldehyde-condensation polymers, their preparation and application.

Products of this invention can generally be prepared by chemically reacting an alkanolamine and paraformaldehyde typically at reflux temeprature in which reaction water separates, preferably through the employment of a water-immiscible solvent, notably benzene. The term "alkanolamine," as used in the specification and claims, is intended to refer to such compounds generally, e.g., methanolamine, ethanolamine, propanolamine, butanolamine, and the like. Ethanolamine at present is a preferred alkanolamine. Similarly, the term "paraformaldehyde" is intended to refer to a compound of the formula $(CH_2O)_3$ and to lower molecular weight compounds and mixtures thereof having the general formula $(CH_2O)_x$, wherein $x$ is a number from about 1 to 4, inclusive.

While the compounds of this invention exhibit biological activity, the present invention does not necessarily contemplate that their use will be restricted to such application but that they will be useful in a variety of applications. In this connection, it will be appreciated that when employed in biological application as well as other uses, they may well be utilized as formulations wherein they constitute but a minor amount of the total composition. For example, they may be employed as essential ingredients in various compositions including a major proportion of one or more diluents, extenders, fillers, conditioners, solvents, and the like, such as various clays, diatomaceous earth, talc, spent catalyst, alumina silica materials, and such liquids as water and various organic liquids, such as acetone, kerosene, benzene, toluene, xylene and other petroleum distillate fractions or mixtures thereof. When liquid formulations are employed, or dry materials prepared which are to be used in liquid form, it is desirable in certain instances additionally to employ a wetting, dispersing or other surface-active agent to facilitate use of the formulation, e.g., Triton X–155 (alkyl aryl polyethyl alcohol).

The term "carrier" as employed throughout the specification and claims is intended to refer broadly to the material constituting a major proportion of a biological active or other formulation, and, hence include finely divided materials, both liquids and solids, as aforementioned, conventionally used in such application.

In order that those skilled in the art may more completely understand the present invention, and the preferred method by which the same may be carried into effect, the following specific example is offered:

EXAMPLE I

*Part A*

PREPARATION OF THE ETHANOLAMINE-PARAFORMALDEHYDE-CONDENSATION POLYMER

A mixture of 61 gm. (1.0 mol) of ethanolamine, 30.0 gm. (1.0 mol) of paraformaldehyde, and 250.0 cc. of benzene is placed in a flask and refluxed for three hours while 19 cc. of water separates. The benzene is removed under atmospheric pressure.

There results a colorless liquid polymeric product weighing 37.5 gm. and having a boiling point of 85°–88° C. at 4–5 mm. mercury pressure. The refractive index of this compound is $n_D^{25°}$ 1.5195. This product is soluble

2 in water, acetone, xylene, and benzene. Molecular weight readings of 240 and 268 are obtained in benzene solution using the boiling point method. The compound is hygroscopic and must be weighed in a closed container. Elemental analysis indicates preparation of a product having the formula $(C_3H_7NO)_x$ and is as follows:

| Element | Actual | Calculated |
|---|---|---|
| C | 49.05 | 49.3 |
| H | 9.47 | 9.58 |
| N | 19.6 | 19.2 |

*Part B*

To illustrate the use of the product of Part A, a test formulation (2000 p.p.m. test compound—5% acetone—0.01% Triton X–155—balance water) is sprayed on growing bean plants, variety Tendergreen, 5–7 inches high, and corn plants. Records are taken fourteen days after treatment. It is observed that the bean plants are wilted and the corn plants are killed.

*Part C*

Further applications of the invention stated in Part A are illustrated by spore germination tests on glass slides which are conducted by the test tube dilution method adopted from the procedure recommended by the American Phytopathological Committee on standardization of fungicidal tests. In this procedure, the test chemical applied in aqueous formulations at concentrations of 1000, 100, 10 and 1.0 p.p.m., is tested for stability to inhibit germination of spores from 7–10 day old cultures of *Alternaria oleracea* and *Sclerotina fructicola*. Germination records are taken after 20 hours of incubation at 22° C. by counting 100 spores. Test compounds are given alphabetical ratings which correspond to the concentration that inhibits germination of half the spores in the test crops, i.e., the so-called "ED–50" value, as follows: A=1.0 to 10 p.p.m.; B=10–100 p.p.m.; C=100–1000 p.p.m.; and D=greater than 1000 p.p.m.

Using this procedure, the product of Part A exhibits ratings of C against *A. oleracea* and B against *S. fructicola*.

It is to be understood that although the invention has been described with specific reference to particular embodiments thereof it is not to be so limited since changes and alterations therein may be made which are within the full intended scope of this invention as defined by the appended claims.

What is claimed is:

1. The method of regulating plant growth which comprises contacting plants with a herbicidal amount of a composition containing as an essential active ingredient a product prepared by reacting substantially equimolar portions of a lower mono-alkanolamine and paraformaldehyde in the presence of benzene at the reflux temperature of the reaction mixture until the stoichiometric amount of water is formed.

2. The method of killing fungus which comprises contacting said fungus with a fungicidal amount of a composition containing as an essential active ingredient a product prepared by reacting substantially equimolar portions of a lower mono-alkanolamine and paraformaldehyde in the presence of benzene at the reflux temperature of the reaction mixture until the stoichiometric amount of water is formed.

References Cited in the file of this patent

UNITED STATES PATENTS 2,194,314 Maxwell -------------- Mar. 19, 1940

(Other references on following page)

UNITED STATES PATENTS

| | | |
|---|---|---|
| 2,215,878 | Johnson | Sept. 24, 1940 |
| 2,228,039 | Peski et al. | Jan. 7, 1941 |
| 2,230,591 | Fischer et al. | Feb. 4, 1941 |
| 2,329,884 | Daskais | Sept. 21, 1943 |
| 2,368,274 | Torley | Jan. 30, 1945 |
| 2,379,555 | Walker | July 3, 1945 |
| 2,596,107 | Silverman et al. | May 13, 1952 |
| 2,792,327 | Hunt | May 14, 1957 |
| 2,799,568 | Allen | July 16, 1957 |
| 2,837,417 | Fisher | June 3, 1958 |
| 2,861,919 | Gilbert | Nov. 25, 1958 |

FOREIGN PATENTS

| | | |
|---|---|---|
| 761,099 | Great Britain | Nov. 7, 1956 |